Figure 1:
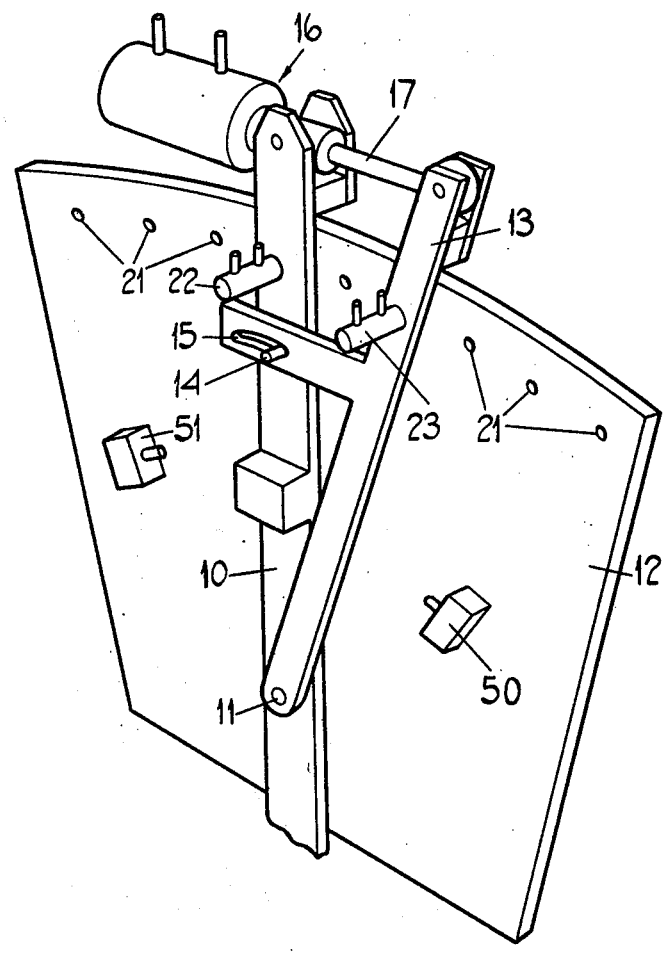

United States Patent [19]

Ryan et al.

[11] 4,100,817
[45] Jul. 18, 1978

[54] AUTOMATIC INDEXING MECHANISM

[75] Inventors: Peter Ryan; Harry Bradley, both of Burnley, England

[73] Assignee: Lucas Industries Limited, Birmingham, England

[21] Appl. No.: 676,689

[22] Filed: Apr. 14, 1976

[51] Int. Cl.² .............................................. F16H 27/00
[52] U.S. Cl. ...................................................... 74/111
[58] Field of Search ................. 74/424.8 VA, 25, 111, 74/157, 148, 527; 91/306; 73/343.5; 60/39.28 T, 39.31

[56] References Cited

U.S. PATENT DOCUMENTS

| 2,338,305 | 1/1944 | Simmon | 74/111 |
| 2,808,728 | 10/1957 | Maguire | 74/25 |
| 2,998,831 | 9/1961 | Doiron | 74/25 |
| 3,431,822 | 3/1969 | Gross | 91/306 |
| 3,574,475 | 4/1971 | Woff | 60/39.28 T |
| 3,635,087 | 1/1972 | Conklin | 73/343.5 |
| 3,774,462 | 11/1973 | Thompson | 74/424.8 VA |

Primary Examiner—Allan D. Herrmann
Assistant Examiner—Wesley S. Ratliff, Jr.
Attorney, Agent, or Firm—Andrus, Sceales, Starke & Sawall

[57] ABSTRACT

An automatic indexing mechanism for stepping one or more thermocouples through selected positions in a gas turbine engine comprises a quadrant plate having an arcuate row of apertures therein. A first arm is pivotally mounted on the plate and carries the one or more thermocouples. A further arm is pivoted mounted on the plate and also with respect to the first arm and has attached thereto a piston rod of a pneumatic piston and cylinder device whose body is fixed to the first arm. Stops actuated by piston and cylinder devices are mounted on the arms and are arranged to be engaged in the arcuate row of apertures in the plate. A pneumatic circuit and an electrical logic circuit control operation of the piston and cylinder devices to effect stepwise movement of the first arm relative to the quadrant plate.

6 Claims, 3 Drawing Figures

AUTOMATIC INDEXING MECHANISM

This invention relates to an automatic indexing mechanism for indexing an article in step wise fashion. The article may be in the form of a thermocouple or bank of thermocouples which require to be stepped through selective positions in a gas turbine engine for the purpose of taking temperature readings at said selected locations.

According to the present invention, there is provided an automatic indexing mechanism comprising a plate and a member mounted for relative pivotal movement, a row of spaced locations on the plate, first and second stops movable into and out of engagement with the locations on the plate, the first stop being mounted for movement with the member and the second stop being mounted for movement on an element which is carried by the member and movable relative thereto to a limited extent, reciprocatable means for effecting relative movement between the member and the element and control means for controlling reciprocation of said reciprocatable means and movement of the movable stop so as to cause movement of the reciprocatable means whilst one stop is engaged and the other stop is disengaged in a manner to effect relative movement between the plate and the member.

Preferably, the locations on the plate are in the form of recesses or apertures in the plate.

Preferably, means are provided for automatically reversing the direction of relative movement.

Advantageously, the automatic reversing means includes a pair of limit switches disposed at either end of the limit of relative movement and connected into the control means.

Most preferably, the member is movable relative to the plate which is fixed.

In a convenient embodiment, the stops and the reciprocating means are fluid operated and double-acting, and the control means is constituted by a reversing valve for each of the stops, each reversing valve including a shuttle movable under the control of a pair of limit switches associated with the respective stops.

Figure 2:
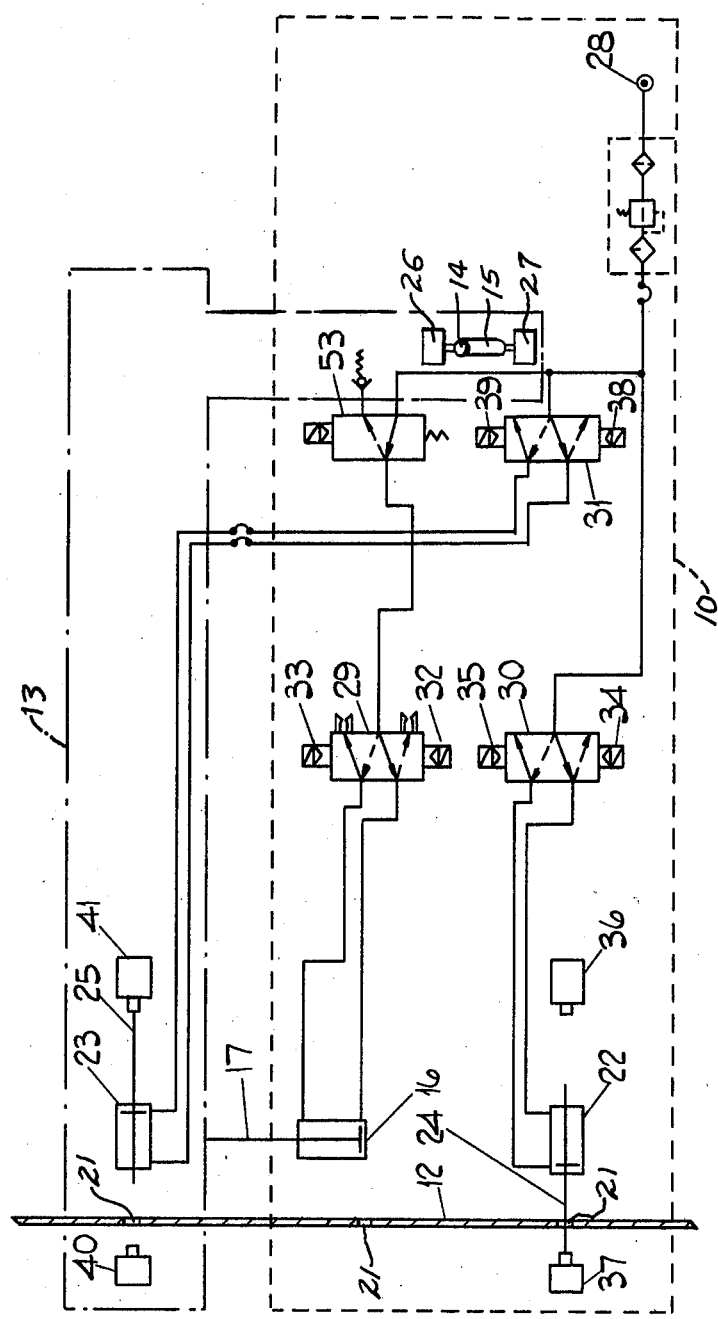
Figure 3:
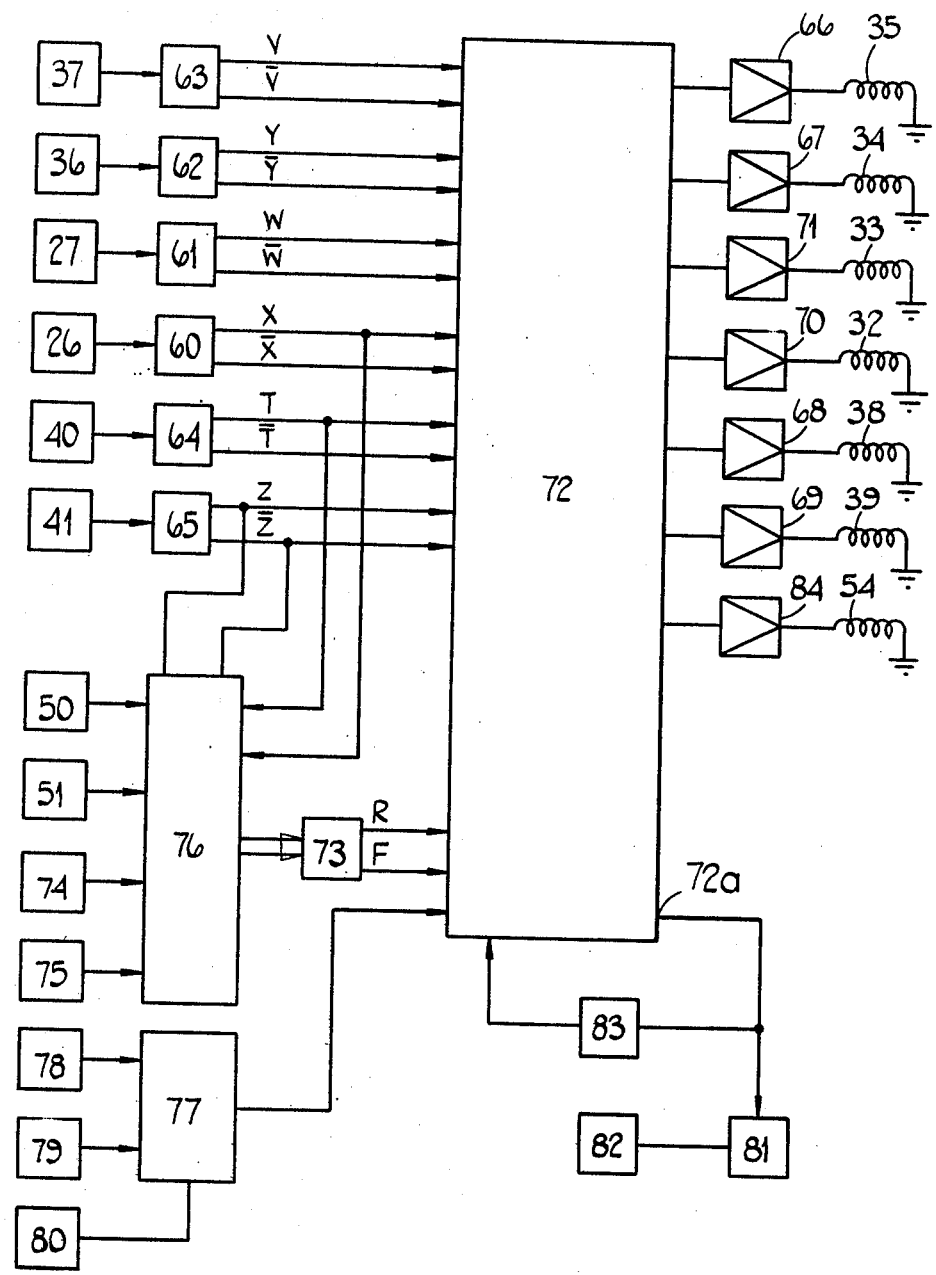

An embodiment of the present invention will now be described, by way of example, with reference to the accompanying drawings, in which:

FIG. 1 is a schematic perspective view of an automatic indexing mechanism according to the present invention, FIG. 2 is a schematic illustration of a pneumatic circuit forming part of a control unit in the automatic indexing mechanism of FIG. 1, and FIG. 3 is a block diagram of a logic circuit forming another part of the control unit of the mechanism of FIG. 1.

The automatic indexing mechanism is for indexing a thermocouple 82 (FIG. 3) or bank of thermocouples in stepwise fashion between selected locations in a gas turbine engine for the purpose of taking temperature readings at said selected locations, so that the characteristics of the gas turbine engine can be evaluated. The thermocouple 82 (not shown in FIG. 1) is mounted on an arm 10 which is pivoted at 11 to a quadrant plate 12. The arm 10 has a branched lever 13 mounted thereon for limited relative movement. Movement of the lever 13 relative to the arm 10 is limited by engagement of a pin 14 on arm 10 with a curved slot 15 in lever 13. A double-acting pneumatic piston and cylinder device 16 is mounted on the end of arm 10 remote from that end carrying the thermocouples, and has a piston rod 17 which is pivotally attached to the lever 13 at the end thereof remote from slot 15. Reciprocation of the piston and cylinder device 16 causes relative movement between the lever 13 and arm 10 as permitted by the slot 15 and pin 14. A row of spaced apertures 21 are provided in the plate 12 and are arranged on an arc centered on the axis of the pivot 11.

First and second pneumatic piston and cylinder devices 22 and 23 are mounted on the arm 10 and lever 13 respectively. The piston and cylinder devices 22 and 23 are double acting and are provided with respective piston rods 24 and 25 (see FIG. 2) which are engageable with the apertures 21 to form stops for preventing relative movement between the arm 10 and plate 12 and the lever 13 and plate 12, respectively. Limit switches 26 and 27 (omitted from FIG. 1 but shown in FIG. 2) are mounted on the lever 13 at either end of the slot 15 therein.

The control forming part of the automatic indexing mechanism includes a source 28 of air pressure which supplies pressure to piston and cylinder devices 16, 22 and 23 via respective reversing valves 29, 30 and 31. Valve 29 is controlled by solenoids 32 and 33 which are themselves under the control of the logic circuit 72 whose state is, in turn, controlled by the condition of limit switches 26 and 27. Similarly, valve 30 is controlled by solenoids 34 and 35 which are themselves controlled by the logic circuit 72 whose state is, in turn, controlled by the condition of limit switches 36 and 37. The limit switch 36 is arranged to be operated by piston rod 24 of piston and cylinder device 22 when disengaged from the apertures 21 in plate 12 whereas limit switch 37 is arranged to be operated by piston rod 24 when the latter is engaged in an aperture 21 in the plate 12. In like manner to valve 30, valve 31 is provided with solenoids 38 and 39 which are themselves under the control of the logic circuit 72 whose state is, in turn, controlled by the condition of limit switches 40 and 41. Limit switch 40 is arranged to be closed when piston rod 25 engages in one of the apertures 21 in plate 12 whilst limit switch 41 is arranged to be operated when the piston rod 25 is disengaged from the apertures 21 in plate 12.

The six limit switches 26, 27, 36, 37, 40 and 41 have their outputs fed to six bistable circuits 60 to 65 respectively. The true outputs of the six bistable circuits 60 to 65 are negative when their respective switches are closed. The bistable circuits 60 to 65 are triggered only when the switches make contact, thus obviating unwanted pulses due to contact bounce.

Movement of piston rod 24, 25 or 17 is effected by appropriate operation of valve 30, 31 or 29, respectively, one solenoid of the valve switching off whilst the other switches on. This is achieved by control logic 72 and respective power amplifiers 66, 67, 68, 69 or 70, 71.

The choice of the solenoid to be energised depends upon whether the indexing mechanism is to move in forward or reverse direction. Any single movement of one of piston and cylinder devices 16, 22 or 23 requires the correct positioning of both of the other devices as information to initiate the move. This information is provided at the outputs of the input bistable circuits 60 to 65 which are fed into the control logic 72 and from there to the amplifiers 66 to 71. (The design of the control logic 72 will not be described in any detail herein as its design will be readily apparent to one skilled in the art when its function has become apparent from the following description). When the traverse gear is in the position shown in FIG. 1 and is to move forward i.e. towards switch 50 the location piston rod 25 must be disengaged from one of the apertures 21 in the plate 12. The necessary conditions and signals are (i) the piston rod 24 must be engaged with operating microswitch 37 giving a negative signal, 'V', (ii) the piston rod 17 is in a retracted state operating microswitch 26 giving a negative signal 'X' and (iii) a forward signal 'F' to be described hereinafter are present in the control logic 72. When these conditions are met, a signal is passed to operate solenoid 38 and cease operation of solenoid 39. Piston rod 25 is thus disengaged from the aperture 21 in the plate 12. All other component movements are similarly initiated and the sequencing information is summarised in Table 1, wherein signals Z, T, Y and W correspond respectively to closure of limit switches 41, 40, 36 and 27 and signal R is a reverse signal.

TABLE 1

| NECESSARY INPUTS TO SEQUENCING GATES FOR CORRESPONDING OPERATION | FORWARD MOTION MICRO SWITCH ACTION | | MECHANISM OPERATION |
|---|---|---|---|
| | OFF | ON | |
| V.X.F. | 40 | 41 | Rod 25 Disengages |
| Z.V.F. | 26 | 27 | Rod 17 Extends |
| W.V.F. | 41 | 40 | Rod 25 Engages |
| T.W.F. | 37 | 36 | Rod 24 Disengages |
| Y.T.F. | 27 | 26 | Rod 17 Retracts |
| X.T.F. | 36 | 37 | Rod 24 Engages |

| NECESSARY INPUTS TO SEQUENCING GATES FOR CORRESPONDING OPERATION | REVERSE MOTION MICRO SWITCH ACTION | | MECHANISM OPERATION |
|---|---|---|---|
| | OFF | ON | |
| T.X.R. | 37 | 36 | Rod 24 Disengages |
| Y.T.R. | 26 | 27 | Rod 17 Extends |
| X.T.R. | 36 | 37 | Rod 24 Engages |
| V.W.R. | 40 | 41 | Rod 25 Disengages |
| Z.V.R. | 27 | 26 | Rod 17 Retracts |
| X.V.R. | 41 | 40 | Rod 25 Engages |

The direction information signals, 'F' forward and 'R' reverse motion, are obtained from the outputs of a bistable circuit 73 which may be changed in state manually or automatically as follows. Manual operation may be obtained by depressing a respective forward or reverse motion push button 74 or 75 (FIG. 3), a positive signal being fed to a direction logic 76 together with a signal $\bar{Z}$ ($\bar{Z}$ is positive only when microswitch 41 is depressed i.e. rod 25 is disengaged from aperture 21), thus preventing an incorrect direction from being selected at either end of travel.

Automatic operation of the direction bistable circuit 73 is necessary at each end of travel, a switch 50 (see FIGS. 1 and 3) marking the forward limit of travel, and a switch 51 (FIGS. 1 and 3) the reverse limit. On striking switch 50, a negative signal is fed to direction logic 76 together with signal Z (Z is negative only when microswitch 41 is depressed i.e. location rod 25 is disengaged from the quadrant plate 12), thus preventing the traverse gear moving in the reverse direction before a recording in the last position has taken place. On receiving both correct signals, the direction bistable circuit 73 is forced into reverse mode.

On returning to park position, the traverse gear strikes microswitch 51, a negative signal is fed together with signals T and X to direction logic 76 (T is negative only when microswitch 40 is depressed i.e. rod 25 is engaged in one of the apertures 21; X is negative only when microswitch 26 is depressed i.e. the rod 17 is in a retracted state) thus allowing hold to be initiated without further movement. On receiving all correct signals, the direction bistable circuit 73 is forced into forward mode.

A start-hold circuit 77 is provided which may be triggered directly from start, hold or inch push buttons 78, 79 or 80 for actuating, holding or causing a single step movement. When the start-hold output signal from this circuit 77 is in a positive (ov) state, it inhibits the logic circuit 72, thus stopping the traverse gear with both piston rods 24 and 25 engaged in respective apertures 21, for either forward or reverse motion. On returning to park position and operating switch 51, the circuit 77 is triggered into its hold state. Control logic 72 has an output 72a which controls a recorder 81. The recorder 81 records signals from thermocouples 82. A signal appears at output 72a when the "VXF" input combination is present. A delay circuit 83 inhibits control logic 72 for a fixed period (200 ms) to enable the recorder 81 to operate before the indexing sequence continues.

If a piston rod 24 or 25 fails to engage in an aperture 21 correctly the respective switch 37 or 40 will not operate. Releasing the pressure in the main cylinder 16 is found to allow a sticking location pin to engage. If piston rod 24 does not engage correctly signal $\bar{V}$ and $\bar{Y}$, or signals $\bar{T}$ and $\bar{Z}$ for piston rod 25 will be negative. These signals are fed into the control logic 72. When the rods 24 and 25 are in normal motion, a two second delay prevents a release valve 53 (FIG. 2) actuated by a solenoid 54 from operating. If this delay time is exceeded, an amplifier 84 switches off power to the solenoid 54 of the release valve 53 allowing it to release the main cylinder pressure to a predetermined level of 5 p.s.i. This then allows correct piston rod operation.

We claim:

1. An automatic indexing mechanism comprising a plate and a member mounted for relative pivotal movement, a row of spaced locations on said plate, first and second stops movable into and out of engagement with said locations on said plate, said first stop being mounted for movement with said member, an element movably attached to said member and movable relative thereto to a limited extent, said second stop being mounted for movement with said element, reciprocating means for effecting relative movement between said member and said element, and control means for controlling the reciprocation of said reciprocatable means and movement of said members and said element and thereby said first and second stops and the engagement of said stops with said plate so as to cause reciprocation of said reciprocatable means while one of said first and second stops is engaged and the other of said first and second stops is disengaged in a manner to effect relative movement between said plate and said member.

2. The automatic indexing mechanism according to claim 1, wherein said locations on said plate are in the form of recesses or apertures in said plate.

3. The automatic indexing mechanism according to claim 1, wherein automatic reversing means are provided for automatically reversing the direction of relative movement.

4. The automatic indexing mechanism according to claim 3, wherein said automatic reversing means includes a pair of limit switches disposed one each at the opposite ends of the limited of relative movement between said plate and said member and connected into said control means.

5. The automatic indexing mechanism according to claim 1, wherein said member is movable relative to said plate which is fixed.

6. The automatic indexing mechanism according to claim 1, wherein said stops and said reciprocating means are fluid operated and double-acting, and said control means is constituted by a reversing valve for each of said stops, each reversing valve including a shuttle movable under the control of a pair of limit switches associated with the respective stops.

* * * * *